(12) United States Patent
Must et al.

(10) Patent No.: US 10,357,804 B2
(45) Date of Patent: Jul. 23, 2019

(54) METHOD FOR INCREASING THE SPEED OF DISCHARGE AND INSERTION OF POSTAL OBJECTS IN A PARCEL TERMINAL AND A PARCEL TERMINAL

(71) Applicant: Cleveron AS, Viljandi (EE)

(72) Inventors: Tarmo Must, Viljandi (EE); Mikk Noorkõiv, Jaska village (EE); Silver Susi, Ubja (EE); Harry Nuudi, Karksi-Nuia (EE); Lauri Hirvesaar, Tallinn (EE); Arno Kütt, Peetrimõisa village (EE)

(73) Assignee: Cleveron AS, Viljandi (EE)

( * ) Notice: Subject to any disclaimer, the term of this patent is extended or adjusted under 35 U.S.C. 154(b) by 0 days.

(21) Appl. No.: 15/730,852

(22) Filed: Oct. 12, 2017

(65) Prior Publication Data
US 2018/0304311 A1 Oct. 25, 2018

(30) Foreign Application Priority Data

Apr. 23, 2017 (EE) .................................. 201700020
Aug. 22, 2017 (EP) .................................... 17187380

(51) Int. Cl.
*B07C 1/02* (2006.01)
*B65G 1/137* (2006.01)
(Continued)

(52) U.S. Cl.
CPC ............. *B07C 1/025* (2013.01); *B07C 3/087* (2013.01); *B65G 1/137* (2013.01); *G06Q 10/0836* (2013.01); *G07F 17/12* (2013.01)

(58) Field of Classification Search
CPC combination set(s) only.
See application file for complete search history.

(56) References Cited

U.S. PATENT DOCUMENTS 6,882,269 B2   4/2005  Moreno
7,925,375 B2 * 4/2011  Schininger ............ G07F 11/007
                                               221/131
(Continued)

FOREIGN PATENT DOCUMENTS

EP     1462392 A2    9/2004
EP     1713034 B1    6/2006
(Continued)

OTHER PUBLICATIONS

Gebhardt Fördertechnik GmbH, Stacking / destacking device, https://www.gebhardt-foerdertechnik.de/en/products/tote-carton-transport-technology/stacking-device/stacking-destacking-device/.

(Continued)

*Primary Examiner* — Kyle O Logan
(74) *Attorney, Agent, or Firm* — Berggren LLP

(57) ABSTRACT

A method for decreasing the time spent on inserting postal objects in and discharging them from a parcel terminal and a parcel terminal comprising at least one storage space with multiple compartments within the parcel terminal for loading and storing postal objects on movable trays; an insertion and discharge area with one or more insertion and discharge slots equipped with a door, and a control unit; a loading mechanism for transporting postal objects from the insertion and discharge area to the storage space of postal objects and from the storage space to the insertion and discharge area. For performing the method, the parcel terminal is provided with a stack of movable trays, an area for storing the stack of movable trays and a stacker of movable trays, the terminal includes a user zone and an internal zone and the method comprises the cycles of inserting and discharging a postal object in the user zone, a cycle parallel with the insertion and/or discharge cycle which is performed in the internal zone of the parcel terminal, a cycle of stacking and/or emptying the stack of trays in the user zone, and gathering (Continued)

and analyzing statistical data on the use of the terminal by means of the control unit.

6 Claims, 11 Drawing Sheets

(51) Int. Cl.
*G07F 17/12* (2006.01)
*G06Q 10/08* (2012.01)
*B07C 3/08* (2006.01)

(56) References Cited

U.S. PATENT DOCUMENTS

| | | | | |
|---|---|---|---|---|
| 8,145,351 | B2* | 3/2012 | Schininger | E05G 1/06 |
| | | | | 221/12 |
| 8,579,574 | B2* | 11/2013 | Hanel | B65G 1/0407 |
| | | | | 414/267 |
| 8,849,445 | B2* | 9/2014 | Holmes | G07F 17/0092 |
| | | | | 700/213 |
| 8,919,637 | B2 | 12/2014 | Kim et al. | |
| 9,946,845 | B2* | 4/2018 | Holmes | G07F 17/0092 |
| 2001/0032443 | A1* | 10/2001 | Tiley | G06Q 20/12 |
| | | | | 53/476 |
| 2003/0065421 | A1* | 4/2003 | Didriksen | B65G 1/00 |
| | | | | 700/230 |
| 2003/0147738 | A1* | 8/2003 | Hanel | B65G 1/02 |
| | | | | 414/807 |
| 2007/0237356 | A1 | 10/2007 | Dwinell et al. | |
| 2009/0149985 | A1* | 6/2009 | Chirnomas | B65G 1/1373 |
| | | | | 700/215 |
| 2009/0312864 | A1* | 12/2009 | Hanel | B65G 1/137 |
| | | | | 700/214 |
| 2011/0097182 | A1* | 4/2011 | Schmit | B65G 1/0407 |
| | | | | 414/277 |
| 2013/0264381 | A1* | 10/2013 | Kim | G07F 17/12 |
| | | | | 232/24 |
| 2015/0302351 | A1 | 10/2015 | Cassady et al. | |
| 2017/0073159 | A1* | 3/2017 | Lossov | G05B 19/124 |

FOREIGN PATENT DOCUMENTS

| | | | |
|---|---|---|---|
| EP | 2876614 | A1 | 5/2015 |
| EP | 3142085 | A1 | 3/2017 |

OTHER PUBLICATIONS

MacDonald Humfrey Automation, Checkpoint Automated Tray Handling http://www.mhaltd.co.uk/mach-secure/Mach-SmartLane.html.

OSTS Tray Carrying System, Oct. 7, 2015 https://www.youtube.com/watch?v=CXgMK0a1vPw.

European Patent Office, European Search Report issued on EP17187380.5, dated Jan. 17, 2018.

* cited by examiner

METHOD FOR INCREASING THE SPEED OF DISCHARGE AND INSERTION OF POSTAL OBJECTS IN A PARCEL TERMINAL AND A PARCEL TERMINAL

PRIORITY

This application claims priority of Estonian application EE P201700020 filed on Apr. 23, 2017 and European application EP 17187380 filed on Aug. 22, 2017, the contents of all of which are incorporated herein by reference.

FIELD OF THE INVENTION

This invention relates to the field of self-service parcel terminals, more specifically to the field of methods for delivery, sending, receiving and storing parcels, packages, mail and other postal objects.

PRIOR ART

Different parcel terminal solutions and processes used to control the inserting and discharging of postal objects are known from the prior art in which each parcel is stored in a separate locker or shelf. The main drawback of these solutions is that inserting and/or retrieving a larger number of parcels one by one is too slow and may take hours if the user needs to insert and/or collect tens or hundreds of postal objects.

An example of the solutions known from the prior art are the processes illustrated in FIGS. 5 and 6 of US patent application US20150302351A1 in which a carousel-like system is used instead of a conventional parcel system based on a shelf system. Compared to the generally known solutions where each parcel is stored on a shelf in a separate locker or container with a door, the shelves in this system form a conveyor system moving circumferentially and multiple doors located one above the other for inserting and retrieving parcels have been provided at the access point of the storage compartment. For inserting or discharging a parcel, a shelf is moved into the position where the compartment with the parcel to be retrieved or an empty compartment for a parcel to be inserted remains behind the corresponding door.

The shortcoming of the solution described in US20150302351A1 and other solutions is that they are very time-consuming because the user can only insert or retrieve one parcel at a time and on every insertion and retrieval, the user has to wait until the shelf system moves into an appropriate position and a corresponding door opens.

The parcel terminals described in U.S. Pat. No. 8,919,637 B2 and European patent application EP2876614A1 may be considered as the closest solutions to the present invention where, in order to ensure the highest capacity, a system of shelves is used inside the parcel storage apparatus for storing parcels of variable size, wherein the supports or rails are fastened to the interior walls of the shelves to which a tray with the stored parcel or package is placed. The drawback of these solutions is also a great time cost because the sequential insertion of several parcels in the parcel storage apparatus or discharging of several parcels from it requires that the parcels are transported to the shelves or from the shelves into the discharge space one by one.

SUMMARY OF THE INVENTION

The object of this invention is to provide a safe solution for inserting and retrieving any postal packages in and from a parcel terminal that saves the user's time, especially in cases when the user wishes to insert or retrieve several packages sequentially at a time or several users do that simultaneously.

According to the invention, the time spent on inserting a postal package means the time that is spent on identifying the user, identifying the postal object inserted in the parcel terminal by the user and on transporting the postal object inserted in the insertion and discharge area to the storage space of the parcel terminal or on placing the postal object by the user into an empty locker or an empty compartment on a shelf. The time spent on retrieving the postal object according to this invention means the time spent on identifying the user, on identifying the postal object to be retrieved by the user and on transporting the postal object from the storage space of the parcel terminal to the discharge area.

Differently from the solutions known in the prior art where the processes required for inserting and retrieving the postal object are performed sequentially, the processes according to this invention for inserting a postal object are performed in different zones of the parcel terminal and simultaneously and the processes required for discharging the postal object are also performed in different zones of the parcel terminal and simultaneously.

So as to allow for the simultaneous performance of the processes needed for inserting and discharging the postal objects, the parcel terminal according to the invention has been divided into the user zone and the internal zone of the parcel terminal that are separated from one another and the processes in these zones are performed simultaneously, whereas for transporting the inserted postal objects to the storage space and the objects to be discharged to the discharge area, trays are used as transportation stands, which provide the most optimal way of storing the postal objects in the storage space according to the invention.

The object of the invention is achieved with a parcel terminal solution which comprises at least one storage space with multiple compartments of unfixed height, wherein the height of the compartments is defined by the height of the postal object placed on the tray, for loading and storing both the trays with postal objects on them and the trays that are not in use; at least one insertion and discharge area with one or more insertion and discharge slots equipped with a door, and with a control unit with a screen and a user interface and other means; at least one loading mechanism that moves vertically and horizontally in order to transport postal objects from the insertion and discharge area to the storage space and from the storage space to the insertion and discharge area. For performing the method, the insertion and discharge area of postal objects is equipped with a device for stacking movable trays and storing the stack of trays used in the operation process, whereas the trays not used in the operation process are stored in the compartmentalised storage space. In order to increase the rate of insertion and discharge of postal objects and to save the time spent on inserting and/or discharging the postal objects, statistical data on the use and operation processes of the parcel terminal is gathered and analysed, and two separate zones, a user zone and an internal zone, are provided, whereas in the user zone the insertion and discharge cycle is performed and in the internal zone a parallel cycle of stacking the trays of postal objects and/or emptying the trays takes place.

The method according to this invention is intended for using in both indoor and outdoor parcel terminals which are convenient, easy and safe to use for all users, couriers as well as receivers or senders of parcels and which, differently from the solutions known by now, allow the users to insert or retrieve much more postal objects at a time.

Compared to the known solutions, time spent on the insertion and discharge of postal objects is saved by the use of parallel loading in the user zone and the internal zone of the parcel terminal and by gathering and analysing statistical data. The use of the faster insertion and discharge method is enabled by the stacking system for trays used to transport inserted and discharged postal objects, a loading mechanism movable vertically and horizontally, the cyclical nature of the method and the use of separated zones of the parcel terminal, namely the user zone and the internal zone of the parcel terminal.

When the user approaches the parcel terminal, the presence of the user and the height of the user at the user zone of the parcel terminal are identified by sensors, cameras, etc., for which visual, biometric, voice or contact identification, for instance, may be used, or identification by a smart card, a magnetic card, a mobile or any other device. After that, the information that the user needs to enter (e.g., QR code, numeric code, password, etc.) is displayed in the user interface on the screen. If it is established upon identification that the user is either in a wheelchair or of a short height, the user interface is lowered on the screen. If it is established that the user is a blind person, the interface for the visually impaired people is activated (e.g., earphone input/soft and directing/guiding/helping Braille).

On the basis of the information entered, the device identifies the user and establishes whether there are postal objects to be discharged to the user or the user wishes to insert postal objects.

Unlike the solutions known by now, in which insertion and discharge of parcels requires a lot of time, the user of the solution according to this invention can insert and retrieve postal parcels much faster because the parcel terminal according to the invention performs fewer stages upon the insertion and discharge of postal objects.

If the user wishes to insert parcels, an empty tray is transported from the stacker to the insertion and discharge area on which the user places the postal object. After the user has placed the parcel on the tray in the insertion and discharge area and the loading mechanism has transported the tray from the insertion and discharge area to the storage space of the terminal, the next tray is delivered from the stacker located near the insertion and discharge area to the insertion and discharge area for the next parcel. The same process is repeated until the last tray is left in the stacker and after that, an additional cycle is performed in the method and the loading mechanism transports another stack of trays from the storage space to the stacker. This step is performed if it is determined that the following process is also insertion and if the loading mechanism is not occupied in another process. Otherwise, the additional cycle is started only after there are no trays left in the stacker and it has been established that the next process is insertion of a parcel.

When a parcel is being discharged, a tray with the stored parcel is transported with the loading mechanism from the storage space to the insertion and discharge area and immediately after the parcel has been removed from the insertion and discharge area by the user and the door to the insertion and discharge area has closed, the empty tray remained in the insertion and discharge area is moved to the stack of empty trays in the stacker near the insertion and discharge area or is left in the insertion and discharge area, depending on whether the next step is insertion of a postal object in the parcel terminal or discharging a postal object from the terminal.

In an alternative embodiment of the invention, the stacker is located below the insertion and discharge area, the tray for a postal object is supported on the stacker and the rate of movement of the trays between the insertion and discharge area and the stacker is the highest in both directions.

If several parcels are retrieved from the parcel terminal one after another, at a certain moment the stacker will be full of empty trays and an additional cycle is performed at that point in which the stacked trays are transported to the storage area with the loading mechanism.

In the insertion and discharge area of postal parcels, it is established by means of a photograph, video, laser or by some other solution whether the tray is full or not, by which it is established whether the tray can be sent to the stacker safely. The sensors of the stacker inform the control unit of the parcel terminal that the trays have been correctly placed one onto the others and that they are removed as prescribed. In the case of non-compliance, the safety system is activated so as to ensure the safety of the user and to prevent damage to the parcel terminal.

In an alternative embodiment of the invention, one or more insertion and discharge areas are provided in the parcel terminal and each of the insertion and discharge areas is connected with one stacker and least one loading mechanism. This way, more than one parallel method according to the invention is performed in the parcel terminal to serve several users at a time who insert and/or retrieve postal objects, which increases the time saved on inserting and discharging postal objects.

So as to achieve the object of the invention, time required for inserting and discharging postal objects is optimised and decreased by gathering and analysing statistical data on the use of the terminal by means of sensors and counting and measuring devices. On the basis of the statistical data on the use and the analysis of the statistical data on operating processes it can be estimated whether the insertion and discharge area should be kept empty for discharging parcels or an empty tray should be kept ready for inserting a parcel. Based on the results of the analysis of statistical data it is possible to determine the time when the terminal is not used by any users and use this time for rearranging the postal objects stored in the parcel terminal according to their size and compartments from which they can be discharged as fast as possible, also the places for empty trays can be determined, so that the storage of inserted postal objects would be as fast as possible.

BRIEF DESCRIPTION OF THE DRAWINGS

The invention will now be described in more detail with reference to the following figures from which.

ILLUSTRATIVE EMBODIMENT

Figure 1:
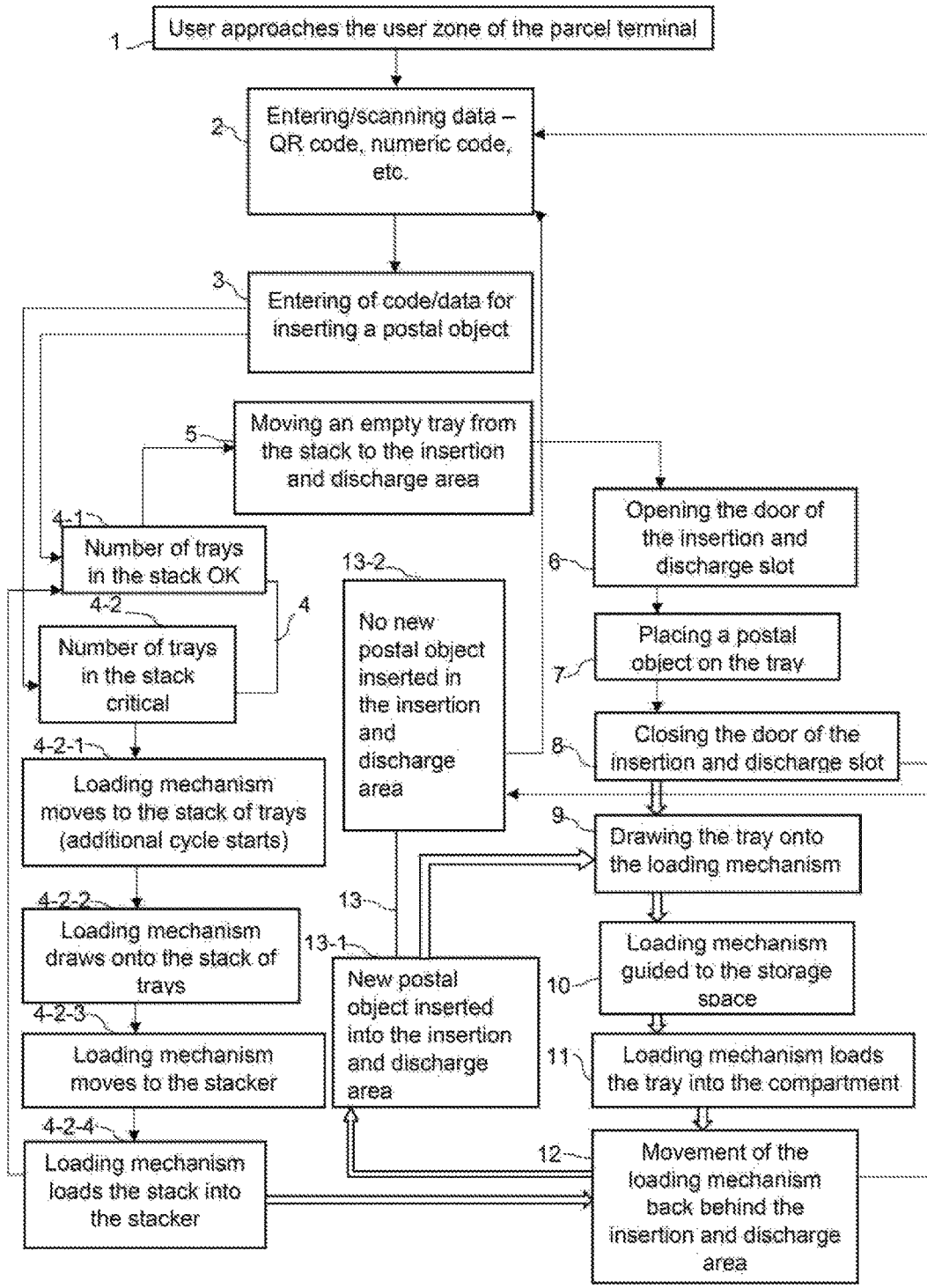
FIG. 1 illustrates the cycle of inserting a postal object in the user zone and a cycle parallel with the cycle of insertion performed in the internal zone of the parcel terminal used in the method according to the invention.

The method according to the invention for decreasing the time spent on inserting a postal object in the parcel terminal and discharging a postal object from the parcel terminal and for increasing the time saving upon insertion or discharge of several postal objects sequentially comprises at least one storage space 27-1 with multiple compartments 27-2 within a parcel terminal for loading and storing postal objects 27-10 on movable stands (for example, base boxes, trays or other stands) 27-6; an insertion and discharge area 27-3 with one or more insertion and discharge slots with at least one door 27-8 for insertion and discharge of postal objects, wherein the insertion and discharge area includes the control unit 27-9; at least one loading mechanism 27-11 for transporting postal objects from insertion and discharge area to the storage space 27-1 of postal objects and from the storage space 27-1 to insertion and discharge area 27-3, which for performing of the method is provided with a stack of movable trays 27-5, a space for storing the stack of movable trays near the insertion and discharge area 27-3 and in the storage space 27-1, a stacker 27-4 of movable trays for moving the trays from the stack to the insertion and discharge area 27-3 and from the insertion and discharge area to the stack; wherein the parcel terminal includes a user zone and the internal zone and the method comprises the following steps:

performing a cycle of inserting a postal object in the user zone of the parcel terminal;

performing a cycle of discharging a postal object in the user zone of the parcel terminal;

performing a cycle parallel with the insertion and/or discharge of a postal object in the internal zone of the parcel terminal;

performing a cycle of stacking the trays for postal objects and/or emptying the stack of trays in the user zone of the parcel terminal; and gathering and analysing statistical data on the use by means of the control unit.

In FIGS. 1 to 4 and FIG. 8, processes performed concurrently in the method according to the invention are designated by double lines.

On the basis of the gathered and analysed statistical data it is established whether to hold the insertion and discharge area 27-3 empty for discharging postal objects 27-10 or keep an empty tray 27-6 in the insertion and discharge area 27-3 ready for inserting parcels or other postal objects 27-10; the optimisation cycle is performed in which, on the basis of the results of the analysis and at the time when the terminal is not used by any users, the postal objects stored in the parcel terminal are rearranged according to their size and compartments in the storage area from which the postal objects can be discharged the fastest, and the location where empty compartments should be so that the storage of postal objects would be the fastest after they are inserted; also, other processes are performed that depend on the results of the analysis.

The cycle of inserting postal objects comprises the steps of:

identifying, by means of sensors provided at the control unit 27-9, the presence of the user at the parcel terminal, in an alternative embodiment, also identifying the height of the user;

identifying the user with the control unit identification means;

identifying with the user interface the intention of the user either to insert or retrieve postal objects;

checking, after identification of the user's intention to insert a postal object, the number of empty trays 27-6 in the stack of trays 27-5 for postal objects, and determining whether the number of trays is sufficient or critical; when the number of trays is sufficient, the insertion cycle is continued, and when the number is critical, the stack is replaced by a new full stack of trays;

drawing with the stacker 27-4 a tray from the stack of empty trays and directing it from the stack to the insertion and discharge area 27-3;

opening the door 27-8 to the insertion and discharge area 27-3 of postal objects so that the user can insert the postal object on the tray 27-6 transported to the insertion and discharge area 27-3;

checking the inserted postal object 27-10 with the sensors of the control unit 27-9;

closing the door 27-8 to the insertion and discharge area 27-3;

starting a cycle parallel with the insertion of a postal object after the door 27-8 closes.

The cycle of discharging postal objects comprises the steps of:

identifying the presence of the user at the parcel terminal;

identifying the user;

identifying the intention of the user either to insert or retrieve postal objects;

checking whether the number of trays 27-6 in the stack 27-5 is sufficient or critical;

after identifying the user's intention to retrieve a postal object, directing the loading mechanism 27-11 to the location of the postal object 27-10 in the storage space 27-1 and drawing the postal object 27-10 onto the loading mechanism 27-11;

delivering the postal object 27-10 with the loading mechanism 27-11 to the insertion and discharge area 27-3;

opening the door 27-8 to the insertion and discharge area 27-3 for discharging the postal object;

closing the door 27-8 after the postal object is discharged;

placing the empty tray 27-6 from the insertion and discharge area 27-3 to the stack of empty trays 27-5;

identifying the user's intention either to insert or retrieve postal objects; when the user's intention to retrieve a postal object is identified, the discharge cycle is repeated, and if the user's intention to insert a postal object is identified, the insertion cycle is continued or a cycle parallel with the discharge cycle is started.

In the step of checking the inserted postal object with sensors, it is either measured or weighed, for example, or its position on the tray is checked so that if the position is incorrect, instructions are displayed on the screen to the user for placing the postal object on the tray in the correct position.

A cycle parallel with the insertion and/or discharge of the postal object comprises the steps of:

drawing the tray 27-6 from the insertion and discharge area 27-3 onto the loading mechanism 27-11 when the postal object 27-10 is inserted and guiding the loading mechanism 27-11 to the location of the postal object in the storage space 27-1 when the postal object is discharged, and drawing the postal object on the loading mechanism and transporting it to the insertion and discharge area;

starting a new cycle for the insertion of a postal object while drawing the postal object from the insertion and discharge area onto the loading mechanism of the parcel terminal and repeating steps 2 to 8 of the insertion cycle (shown on FIG. 1), thus saving the time spent on entering/scanning the code/necessary data and on inserting the next parcel;

guiding, during the insertion cycle, the loading mechanism 27-11 with a postal object 27-10 placed on the tray to the storage area where an empty compartment compatible with the dimensions of the postal object is selected;

loading, with the loading mechanism 27-11, the postal object 27-10 with the tray 27-6 on which the postal object is placed in the selected compartment;

directing the loading mechanism 27-11 back to the insertion and discharge area 27-3;

checking whether a new cycle of inserting or discharging a postal object is started and repeating steps 8 and 9 of the parallel cycle if the insertion cycle of the postal object has been identified.

According to one embodiment of the invention, a cycle of stacking the trays and/or emptying the stack of trays is performed if it is determined that there are not enough trays for postal objects to be inserted, comprising the following steps:

guiding the loading mechanism 27-11 to the stack 27-5 with critical number of trays;

drawing the stack 27-5 with a critical number of trays onto the loading mechanism 27-11;

guiding the loading mechanism to the stacker 27-4 of trays;

loading the stack 27-5 with critical number of trays into the stacker 27-4;

adding a required number of trays 27-6 with the stacker to the stack of trays 27-5 in parallel with discharging postal objects;

transporting, with the loading mechanism 27-11, the stack 27-5 with sufficient number of trays back to the storage space of trays; and stacking empty trays and providing a stack of trays in the case there are no stacks with critical number of trays.

FIG. 1 illustrates a method according to the invention for discharging a postal object from the parcel terminal, the insertion cycle of a postal object in the user zone for decreasing the time required for inserting the postal object, and a cycle in the internal zone of the parcel terminal performed in parallel with the insertion of a postal object. When the user approaches 1 the user zone of the parcel terminal 26, the presence of the user and the height of the user at the parcel terminal are identified with the sensors (e.g., a camera, etc.) of the control unit. Upon identification of the user, options for identification and for entering necessary information (e.g., QR code, numeric code, password, etc.) are displayed for the user in the user interface. For example, if it is established upon identification that the user is either in a wheelchair or of a short height, the user interface is lowered on the screen. For the blind users, a user interface for visually impaired people is provided (e.g., earphone input/soft and directing/guiding/helping Braille).

If the parcel terminal is in a public network, it may happen that at one terminal more than one identifications need to be performed. If, for example, the number of users of a parcel terminal reaches hundreds or thousands and one identification means (e.g., code, password, etc.) recurs, several postal objects may be identified under the same identification means although the persons inserting or retrieving a postal object are different users. In this case, a repeated identification is performed in order to determine whether the user wishes to insert or retrieve a postal object or whether the user is a private person or a company.

After that and upon insertion of the user's details in the user interface, the user's intention to insert postal object(s) 3, the number of postal objects, the receivers and other information concerning the delivery of postal objects is identified.

This is followed by checking 4 the availability of sufficient number of vacant trays in the parcel terminal. For that, a counting device for counting the number of trays is used, which determines whether the number of trays in the stack is sufficient 4-1.

If it is established 4-2 that the number of trays in the stack is insufficient and therefore, the postal objects cannot be inserted (i.e. the stack in the stacker at the insertion and discharge area is empty or the number of trays in the stack is smaller than the number of parcels to be inserted), an additional cycle is performed for providing enough trays, wherein the loading mechanism is guided together with the insufficient number of trays loaded from the stacker or after receiving from the stacker a notice that there are no trays in the stacker to the storage space to the nearest stack with sufficient number of vacant trays 4-2-1, the stack in the storage area full of trays is drawn onto the loading mechanism 4-2-2, the loading mechanism with a stack full of trays is guided from the storage area to the stacker near the insertion and discharge area of postal objects where the stack is retained from which the trays are moved for inserting the postal objects to the insertion and discharge area of postal objects 4-2-3; with the loading mechanism, the stack full of trays is loaded into the stacker located near the insertion and discharge area of postal objects 4-2-4; after loading the stack with sufficient number of trays into the stacker, the loading mechanism is guided, in parallel with other processes (e.g., identification of data entered by the user or establishing that the number of trays is sufficient and continuing with cycle 4-1) back 12 behind the insertion and discharge area of postal objects.

If the number of trays in the stack is sufficient, an empty tray from the stack of trays placed one on the other is moved 5 to the insertion and discharge area of postal objects. Thereafter, the door of the insertion and discharge slot is opened 6.

When the user has placed 7 a postal object on the empty tray in the insertion and discharge area, the door to the insertion and discharge area closes 8.

In alternative embodiments of the solution according to the invention, the postal object placed on the tray is weighed by weight sensors and/or instructions are given (using, for example, laser rays, different markings, audio and/or visual instructions, etc.) how to insert a postal object correctly.

After the door to the insertion and discharge area closes 8, an option is displayed in the user interface on the screen to the user for entering information 2 for inserting the next postal object.

At the same time, a cycle parallel with the insertion of the postal object is started in the internal zone of the parcel terminal after the door to the insertion and discharge area closes 8. The parallel cycle performed in the internal zone of the parcel terminal is not entirely simultaneous with the insertion cycle of the postal object performed at the user zone. It means that after the door closes, the tray with the postal object on it is drawn 9 onto the loading mechanism for transporting the postal object to the storage space. As the door is closed, an option is displayed in the user interface on the screen 2 for inserting the next postal object to the insertion and discharge area of postal objects, but at the same time, the postal object already inserted in the parcel terminal is being transported to the storage space of postal objects.

Unlike the other solutions where all steps from the identification of the user to the insertion of the postal object in the storage area are performed in sequence and for inserting several postal objects, the process has to be repeated with each postal object and a lot of time is spent on it, insertion of several postal objects with the method according to this invention, which includes a parallel cycle, is much more time saving for the user since the insertion of a following postal object and transporting the postal object already inserted into the storage space is performed at the same time. By using for the insertion of postal objects in the parcel terminal the method according to the invention, time is saved due to the fact that the insertion cycle (i.e. displaying for the user options in the user interface for entering the user's details, identification of the user and identification of the next inserted postal object) is performed simultaneously with the steps of transporting the inserted postal object to the storage area by means of the loading mechanism, placing a new empty tray from the stack of trays for postal object to the insertion and discharge area and guiding the loading mechanism back from the storage space to the insertion and discharge area of postal objects for transporting the next inserted postal object to the storage space.

In addition, by separating the user zone from the internal zone of the parcel terminal, the method according to the invention increases the safety of the user and makes the use of the parcel terminal more convenient.

A parallel cycle provides for a coordinated operation of the insertion and discharge area, the loading mechanism and the stacker, which in turn allows for the parallel action of the user and the parcel terminal, increasing the safety and convenience for the user.

In an alternative embodiment of the invention, the separation of the two zones is provided by closing the rear part of the insertion and discharge area at the time of performing the processes in the internal area so that the front part of the insertion and discharge area can still be used.

The loading mechanism is guided 10 near the storage space of postal objects, a compartment with suitable measures is selected and the tray with a postal object on it is loaded with the loading mechanism 11 to the selected compartment in the storage space. After that, the loading mechanism is moved back 12 behind the insertion and discharge area of postal objects.

For repeating the parallel cycle, it is first established whether the user has inserted more parcels in the insertion and discharge area 13. If the user has in the user zone inserted a new postal object to the insertion and discharge area of postal objects 13-1, a parallel cycle is repeated in the internal zone of the parcel terminal starting from drawing the tray 9 onto the loading mechanism. If it is established 13-2 that there are no new postal objects in the insertion and discharge area of postal objects, the parallel cycle in the internal zone is terminated.

Figure 2:
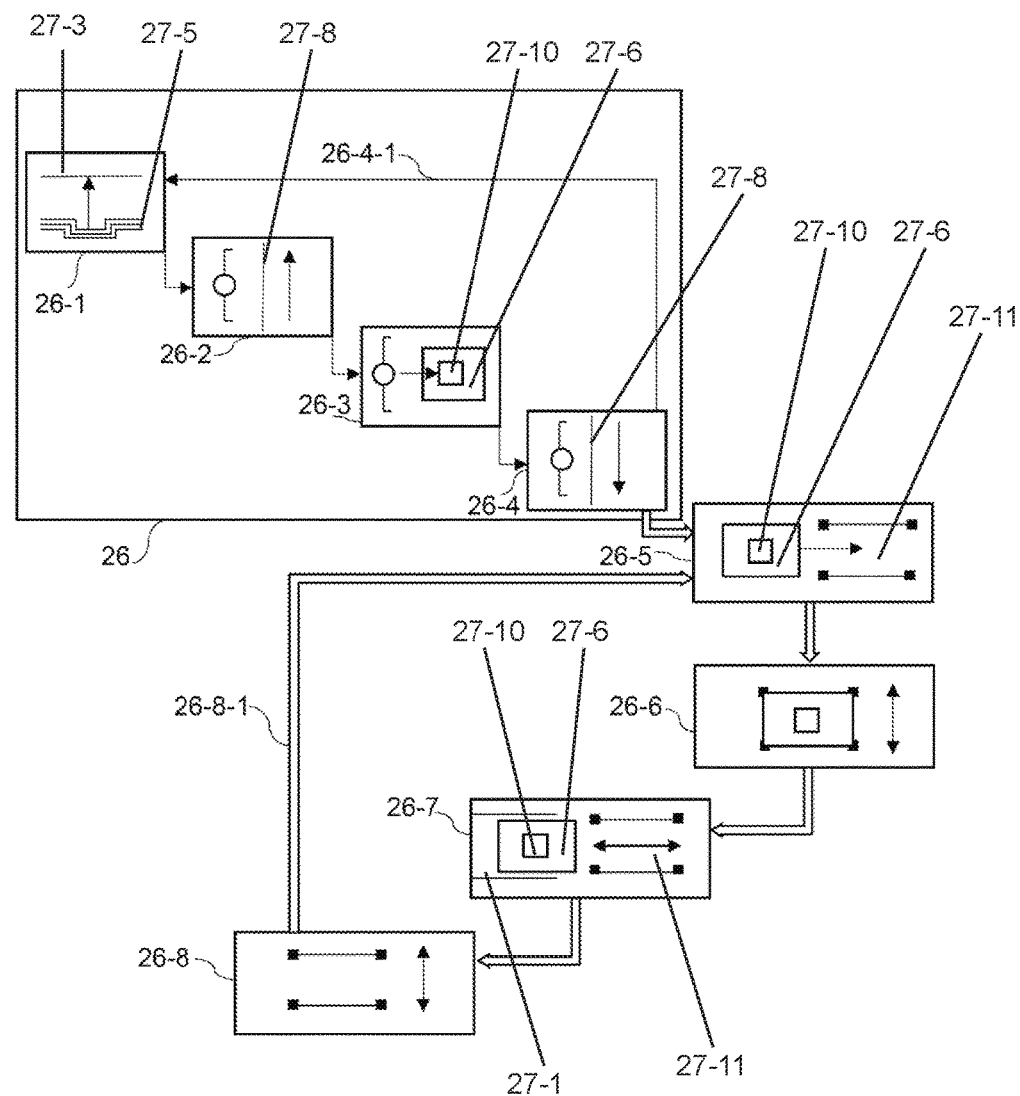
FIG. 2 describes the user zone and the internal zone of the parcel terminal used in a method according to the invention.

FIG. 2 describes parallel steps according to the method of the invention which are performed in the user zone and the internal zone upon insertion of the postal object.

In the user zone, an empty tray 27-6 is moved 26-1 from the stack of trays 27-5 to the insertion and discharge area 27-3 of postal objects 27-10, the door of the insertion and discharge slot 27-8 is opened 26-2, placing by the user of a postal object 27-10 on the tray 27-6 in the insertion and discharge area 27-3 of postal objects is identified 26-3, and the door of the insertion and discharge slot 27-8 is closed 26-4. In the internal zone, at the same time, the tray with a postal object is drawn 26-5 onto the loading mechanism 27-11, the loading mechanism 27-11 with the tray 27-6 and a postal object 27-10 on it is guided 26-6 to the storage space 27-1 of postal objects, the tray with a postal object on it is loaded 26-7 with the loading mechanism into the compartment of storage space 27-1 with suitable dimensions 26-8, the loading mechanism 27-11 is guided from the storage space back to the internal part of the parcel terminal in the rear part of the insertion and discharge area of postal objects. At the time when the tray with a postal object on it is drawn 26-5 onto the loading mechanism, another empty tray is moved 26-1 from the stack of trays to the insertion and discharge area 27-3 of postal objects. If the user's intention to insert more than one postal object is established, the cycles are repeated correspondingly.

Figure 3:
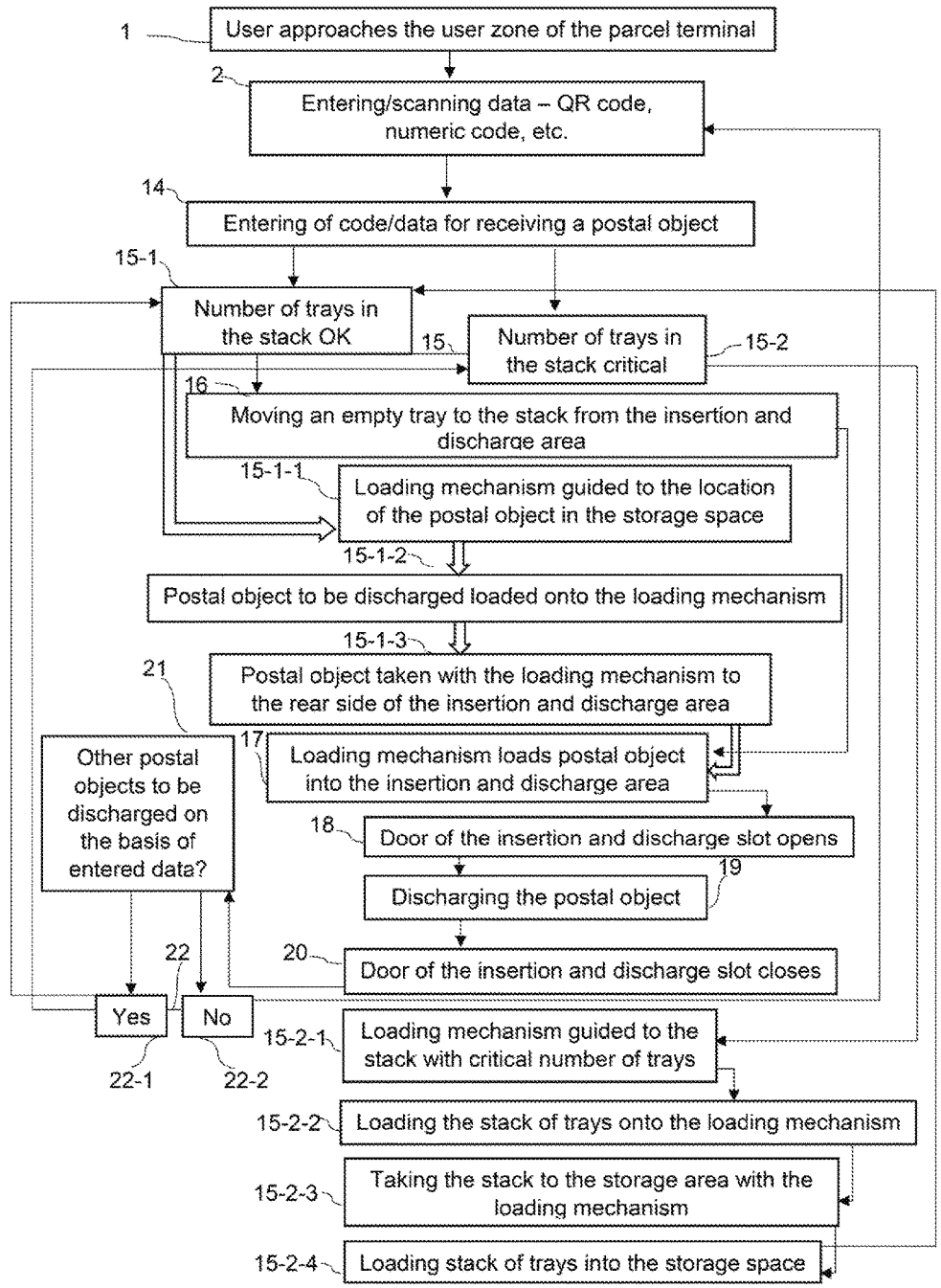
FIG. 3 describes the discharge cycle of the postal object according to the invention.

FIG. 3 describes the discharge cycle of a postal object of the method according to the invention for decreasing the time spent on inserting and discharging postal objects.

When the user approaches 1 the user zone of the parcel terminal 26, the presence of the user and the height of the user at the parcel terminal are identified with the sensors (e.g., a camera, etc.) of the control unit. Upon identification of the user, options for identifying the user and entering necessary information (e.g., QR code, numeric code, password, etc.) are displayed for the user in the user interface. For example, if it is established upon identification that the user is either in a wheelchair or of a short height, the user interface is lowered on the screen. For blind users, a user interface for visually impaired people is provided (e.g., earphone input/soft and directing/guiding/helping Braille). If the parcel terminal is in a public network, it may happen that at one terminal, more than one identifications need to be performed.

After that, it is established, on the basis of the details entered by the user in the user interface, whether the user wishes to insert or retrieve 14 postal object(s).

With the counting device, the number of trays in the stack near the insertion and discharge area of postal objects is checked 15 so as to determine whether the number of trays in the stack is sufficient or critical. If it is established 15-1 that the number of trays in the stack near the insertion and discharge area of postal objects is sufficient, it may mean that there are no trays in the stack or, in an alternative embodiment, that there is enough room in the stack for moving a stack of empty trays from the insertion and discharge area after the discharge of postal objects.

If it is established 15-2 that the number of trays in the stack near the insertion and discharge area 27-3 of postal objects is critical, it means that there is less room in the stack for empty trays 27-5 than needed for moving empty trays into the insertion and discharge area after the discharged postal objects. In this case, an additional cycle is performed upon discharging postal objects wherein the loading mechanism is guided 15-2-1 to the stack with critical number of trays, the stack with critical number of trays is loaded 15-2-2 onto the loading mechanism; the stack with critical number of trays loaded to the loading mechanism is taken with the loading mechanism 15-2-3 to the storage space and the stack is loaded 15-2-4 into the storage space, which ensures that the number of trays in the stack near the insertion and discharge area of postal objects is suitable 15-1 so that there is enough room for empty trays to be piled in the stack.

After it is established 15-1 that the number of trays in the stack is suitable, a parallel, not synchronous cycle is started 15-1-1 in the internal zone of the parcel terminal in which the loading mechanism is guided to the location in the storage area of the postal objects being discharged. The postal object being discharged is, with the tray on which it is, loaded (e.g., drawn or lifted) 15-1-2 onto the loading mechanism. With the loading mechanism, the postal object being discharged and the tray on which it is are taken 15-1-3 to the rear side of the insertion and discharge area of postal objects and the postal object on the tray that is being discharged is loaded 17 from the loading mechanism to the insertion and discharge area of postal objects, the door of the insertion and discharge slot is opened 18, the postal object is discharged 19 and the door of the insertion and discharge slot is closed 20. After that it is established whether the user wishes 14, under the information already entered, retrieve other postal objects 21, and if it is established that the user wishes to retrieve more postal objects 22-1, a parallel, not synchronous cycle is started 16 in the internal zone of the parcel terminal after the door of the insertion and discharge slot is closed 20, which means that the number of trays in the stack is determined 15-1, an empty tray is moved from the insertion and discharge area of postal objects to the stack of trays in the stacker near the insertion and discharge area and a number of trays in the stack is established 15-2. As in this case the loading mechanism does not need to perform a separate step of taking away the tray, time is saved upon discharging a postal object and discharging of postal objects is much faster than it is in the solutions known so far.

If after closing the door of the insertion and discharge slot 20 it is established 21, on the basis of entered information 14, that the user does not intend to retrieve any additional postal objects 22-2, the cycle is terminated and initial options are displayed 2 in the user interface on the screen of the parcel terminal.

Figure 4:
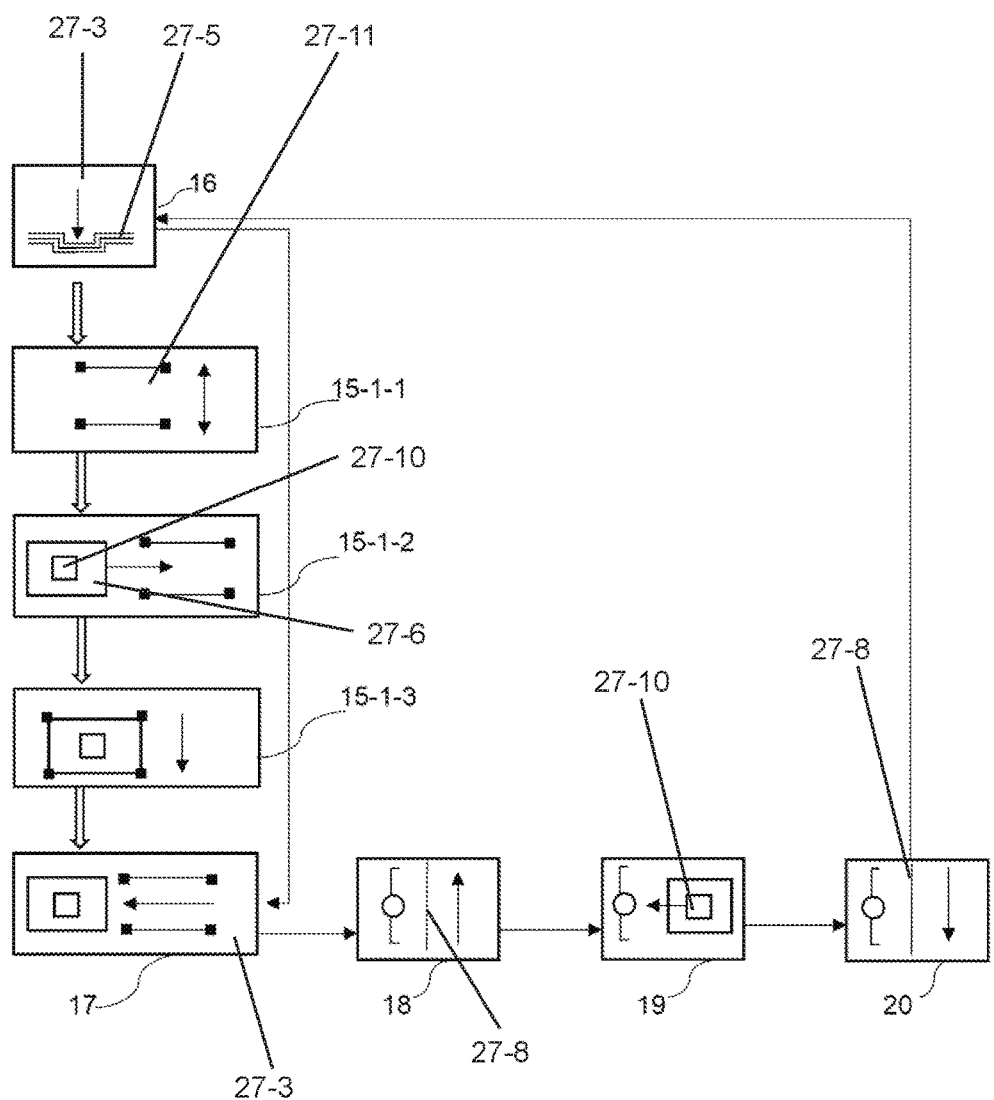
FIG. 4 describes parallel steps according to the method of the invention which are performed in the user zone and the internal zone when the postal object is discharged from the parcel terminal.

FIG. 4 describes parallel steps according to the method of the invention which are performed in the user zone and the internal zone of the parcel terminal when the postal object is discharged from the parcel terminal.

In the user zone, an empty tray 27-6 is moved 16 from the insertion and discharge area 27-3 of postal objects to the stack of empty trays 27-5 in the stacker 27-4. At the same time in the internal zone of the parcel terminal, the loading mechanism 27-11 is guided 15-1-1 from the insertion and discharge area 27-3 to the location of the stored postal object in the storage space 27-1, the tray 27-6 with the postal object 27-10 on it is loaded 15-1-2 onto the loading mechanism 27-11, the loading mechanism is guided 15-1-3 to the insertion and discharge area 27-3, the tray with the postal object is loaded 17 with the loading mechanism from the internal zone of the parcel terminal to the user zone in the insertion and discharge area 27-3, the door of the insertion and discharge slot 27-8 is opened 18, the postal object 27-10 is discharged 19, and the door of the insertion and discharge slot 27-8 is closed 20.

Figure 5:
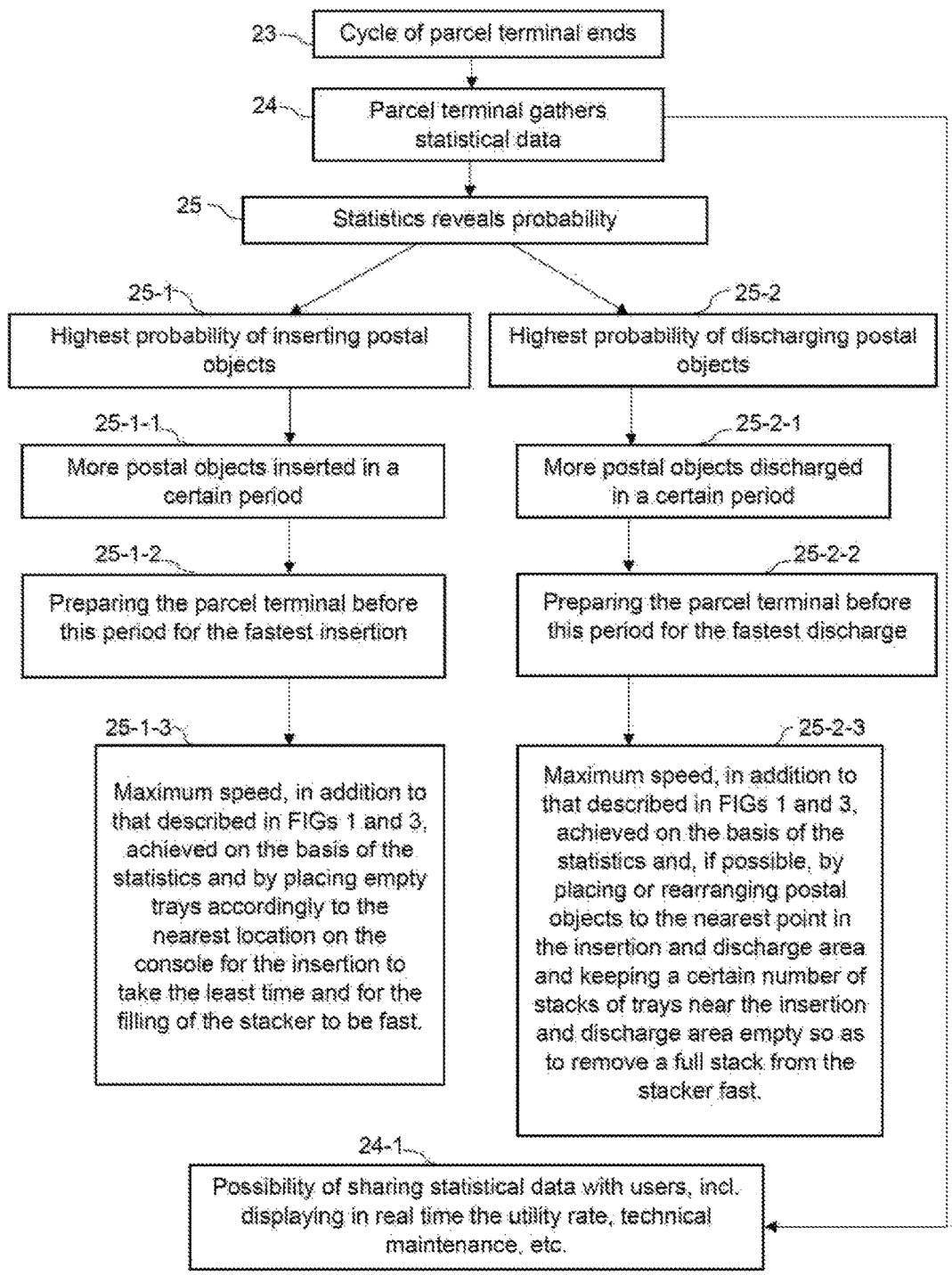
FIG. 5 describes gathering statistical data according to the method of the invention and the self-learning process of the parcel terminal based on the relevant steps of the method.

FIG. 5 describes gathering statistical data according to the method of the invention and the self-learning process of the parcel terminal based on the relevant steps of the method.

According to the method of the invention, the parcel terminal employing the present method can be adjusted from one setting to the other on the basis of statistical data gathered during the operation of the terminal and an analysis of gathered statistical data. The preparation for adjusting and/or adjusting is preferably performed when the parcel terminal is used the least. For example, if the dates and/or times are established on the basis of gathered statistical data and the analysis of this information when the probability of inserting or retrieving postal objects by the users is the highest or the lowest and when the number of parcels discharged is smaller or larger, it is possible to ensure the sufficient number of empty trays in the stacker near the insertion and discharge area and the number of empty compartments in the storage area as near as possible to the insertion and discharge area so that the insertion of new postal objects would be as fast as possible, and/or to rearrange the postal objects stored in the storage area so that their discharging would be as fast as possible. In addition, the dimensions of the inserted parcels are taken into account in the operation of the parcel terminal and if it is established on the basis of gathered data that during some periods postal objects of the same or similar dimensions are likely to be inserted, in an alternative embodiment of the method according to the invention the dimensions of the compartments in the storage area are adjusted before the established period so that as many postal objects of the same or similar dimensions as possible could be inserted as tightly as possible and/or as fast as possible, and in a preferred embodiment, supports 27-7 of the trays (e.g., rails) are used to form compartments in the storage space with the distance between them that makes it possible to accommodate postal objects on the trays on the basis of their dimensions as tightly as possible, which provides an opportunity to achieve the optimal and the tightest depositing of postal objects in the storage space. Also, information of other activities of the users is gathered, for example, when different postal objects are sent and which are the dimensions of the postal objects, etc.

After a certain number of cycles is performed and the statistical data is gathered (e.g., how many postal objects are inserted/discharged at certain times), the method according to the invention is adjusted on the basis of the users' needs and by anticipating the patterns of use by the users of the parcel terminal, insertion and discharging of a larger number of postal objects is ensured in the relevant periods.

For the self-learning 23 of the parcel terminal, corresponding sensors connected with the control unit of the parcel terminal are used to observe each cycle and processes performed in each cycle, also statistical data is gathered 24 on operation processes and cycles, and on the patterns of use of the terminal by the users. In addition to gathering statistical data and analysing it, in an alternative embodiment of the invention the gathered and analysed data is shared 24-1 with the users of the parcel terminal, by displaying, for example, real time information on the utility rate of the parcel terminal, technical maintenance, etc. On the basis of the analysis of the gathered statistical data 25, the probability of the frequency of insertion and discharge in a certain period is determined, and on the basis of that, the patterns of use by the users are predicted in different periods so as to determine the times when the probability of inserting 25-1 or the probability of discharging 25-2 of postal objects is higher.

If it is derived from the analysis of the gathered statistical data 25-1-1 that more postal objects are inserted in a certain period, the parcel terminal is prepared 25-1-2 before the established period for insertion of postal objects with the minimal amount of time spent on it, i.e. for receiving the inserted postal objects in the insertion and discharge area and for transporting from insertion and discharge area to the storage space.

The time spent on inserting the postal objects in the insertion and discharge area 27-3 and transporting to the storage space 27-1 and from the storage space 27-1 to the insertion and discharge area 27-3, also the time spent on discharging postal objects from the parcel terminal is decreased 25-1-3 by gathering and analysing statistical data and by placing empty trays, on the basis of the statistical data, to the nearest location in the insertion and discharge area so that filling the stack of trays and transporting an empty tray to the insertion and discharge area would be as fast as possible.

If it is derived from the analysis of the gathered statistical data 25-2-1 that more postal objects are discharged in a certain period, the parcel terminal is prepared 25-2-2 before the established period for discharging postal objects with the minimal amount of time spent on it, i.e. for transporting the postal objects to be discharged from the storage space to the insertion and discharge area and for discharging them from the insertion and discharge area.

The minimal amount of time spent is achieved 25-2-3 by gathering and analysing statistical data and by placing, if necessary based on the analysis of the gathered information, postal objects in the storage space to the nearest location from the insertion and discharge area and by keeping the stack of trays for postal objects in the stacker as empty as possible, incl. the optimal number of empty stacks when preparing the location.

In an alternative embodiment of the invention, the users are suggested the most suitable times for inserting or retrieving postal objects.

Figure 6:
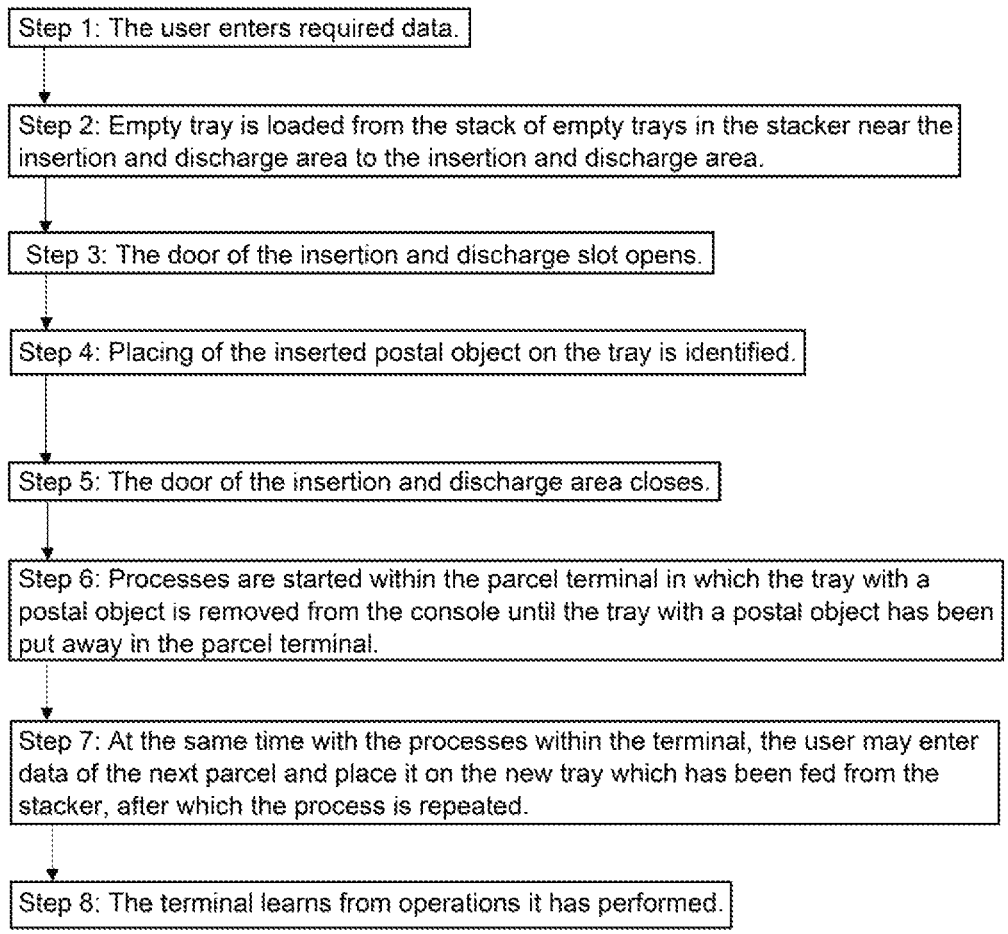
FIG. 6 is a block diagram showing how the amount of time spent on inserting postal objects is decreased with the method according to the invention.

FIG. 6 is a block diagram showing how the amount of time spent on insertion of postal objects is decreased with the method according to the invention.

According to the method of the invention, time saving upon insertion of postal objects is ensured with the following steps: displaying for the user options of entering information necessary for the insertion of postal objects 2 in the user interface on the screen of the insertion and discharge area; loading 5 an empty tray from the stack of empty trays in the stacker near the insertion and display area of postal objects into the insertion and discharge area; opening 6 the door of the insertion and discharge slot; identifying 7 that a postal object has been set on an empty tray in the insertion and discharge area of postal objects; closing the door of the insertion and discharge slot; starting 9-11 the cycles in the internal zone of the parcel terminal wherein the tray with a postal object on it is transported with the loading mechanism from the insertion and discharge area to the storage space; loading, at the same time when the processes are started in the internal zone of the parcel terminal, a new empty tray from the stack to the insertion and discharge area for inserting another postal object 5-8.

The insertion and discharge area of postal objects is safe for the user and different processes performed are parallel, not synchronous. The processes performed in the user zone are separated from the processes performed in the internal zone of the parcel terminal so that the user may operate the insertion and discharge area in the fastest manner. The door of the insertion and discharge slot opens for the user only when it is safe to use after the stacker and the loading mechanism have performed their operations at the insertion and discharge area and the insertion and discharge area has been separated from the processes being performed in the internal zone of the parcel terminal.

Consequently, time saving upon insertion of postal objects is achieved, compared to the other solutions known from the prior art, due to the fact that the user can operate the insertion and discharge area at the time when processes in the internal zone of the parcel terminal are being performed. In addition, time is saved because there is no need for a separate step of searching empty trays for transporting inserted postal objects and taking them to the insertion and discharge area, but the trays are stored near the insertion and discharge area from where they are moved to the insertion and discharge area. Also, time is saved with preparing the processes of the parcel terminal upon insertion of postal objects on the basis of the gathered and analysed statistical data and with adjusting the method of the invention by an automated self-learning based on the analysis of the gathered statistical data.

Figure 7:
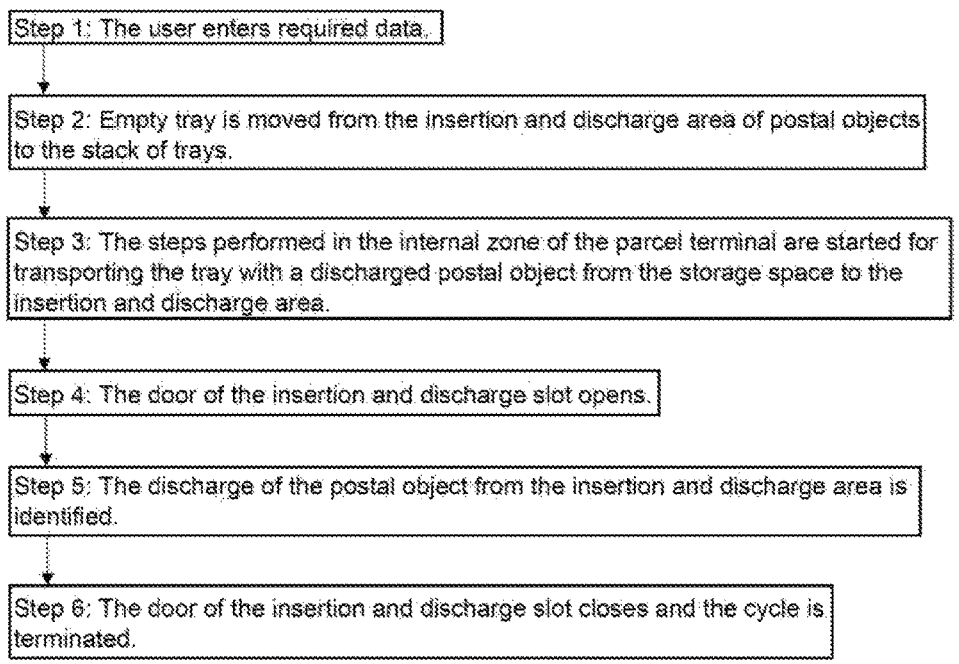
FIG. 7 is a block diagram showing how the amount of time spent on discharging postal objects is decreased with the method according to the invention.
Figure 8:
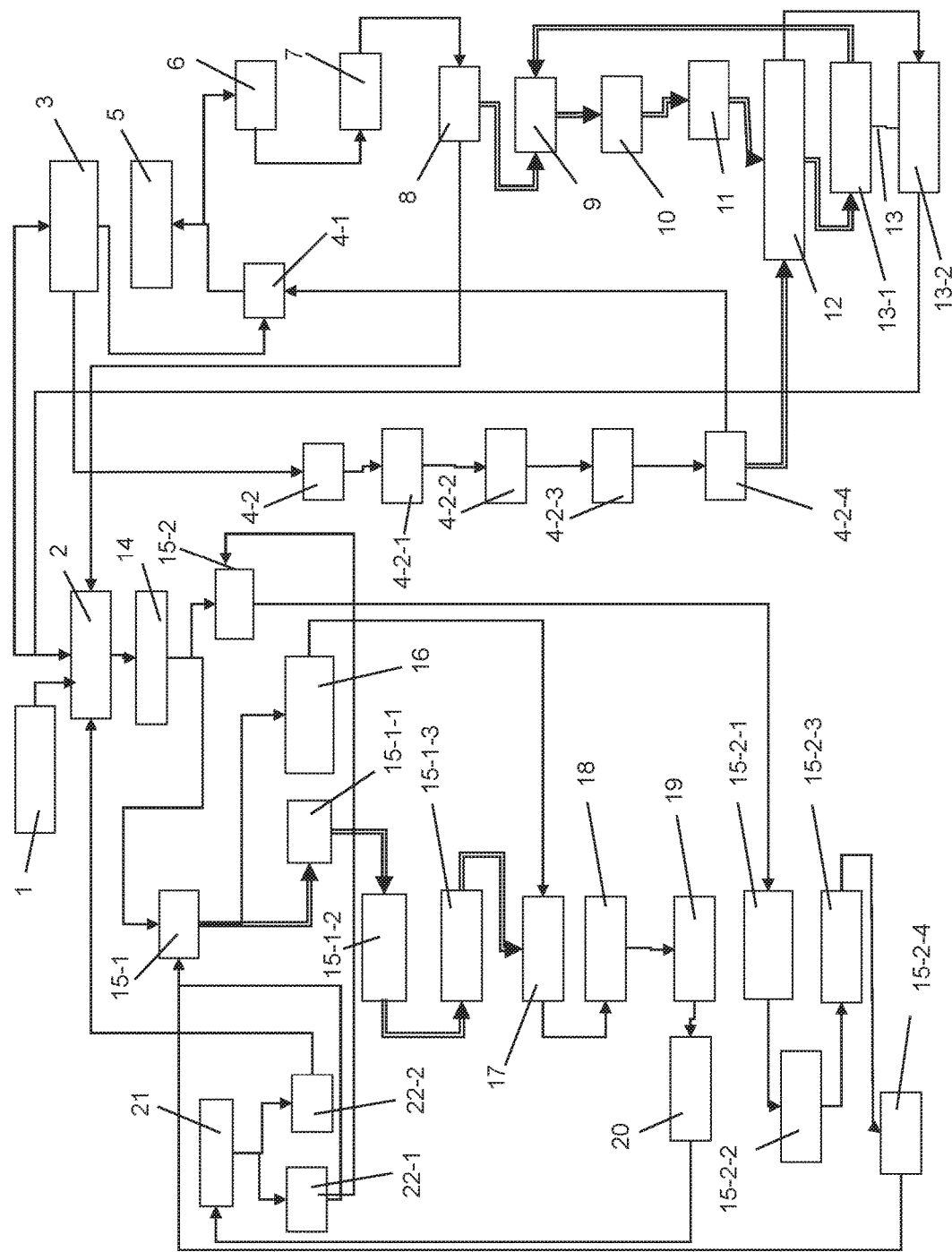
FIG. 8 is a general block diagram of the method according to the invention which comprises cycles, steps and zones for performing the method depicted in FIGS. 1 and 2.

FIG. 7 is a block diagram showing how the method according to the process saves time spent on discharging postal objects.

According to the method of this invention, time saving upon discharging postal objects is ensured with the following steps: displaying for the user options of entering in the user interface on the screen the insertion and discharge area information necessary for retrieving a postal object 2; moving an empty tray 16 from the insertion and discharge area of postal objects to the stack of trays for postal objects in the stacker near the insertion and discharge area; starting the steps of the method performed in the internal zone of the parcel terminal for transporting the tray with a postal object on it from the storage area to the insertion and discharge area of postal objects 15, 17; opening 18 the door of the insertion and discharge slot, identifying 19 the discharge of the postal object from the insertion and discharge area, closing 20 the door of the insertion and discharge slot and terminating the cycle.

The door of the insertion and discharge slot is open for the user only when operating the parcel terminal is safe for the user and the operations of the stacker and the loading mechanism at the insertion and discharge area of postal objects is finished.

Upon discharging postal objects, compared with solutions known from the prior art, time saving is achieved because there is no need for a separate step of taking the trays away from the insertion and discharge area but they are moved from the insertion and discharge area to the stack of empty trays in the stacker near the insertion and discharge area; when several postal objects are discharged to the user, discharging of the postal object to the user and transporting the next postal object to be discharged in the internal zone of the parcel terminal from the storage space to the insertion and discharge area are performed as parallel cycles; in addition, time is saved because the operations of the parcel terminal upon discharging postal objects are prepared on the basis of the gathered and analysed statistical data and the method of the invention is adjusted by automated self-learning on the basis of the analysis of the gathered statistical data.

Figure 9:
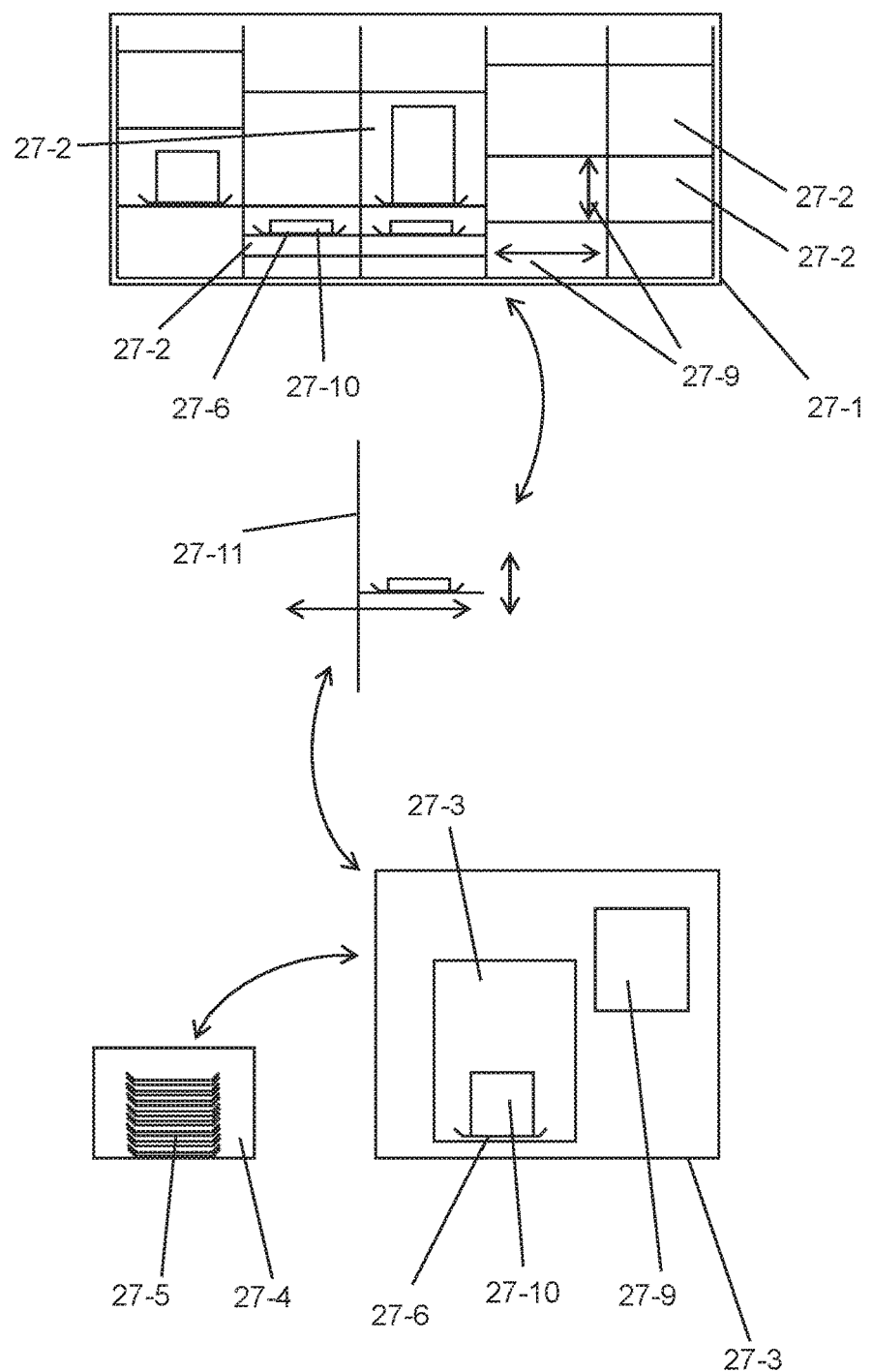
FIG. 9 is the simplified diagram of the parcel terminal according to the invention.
Figure 10:
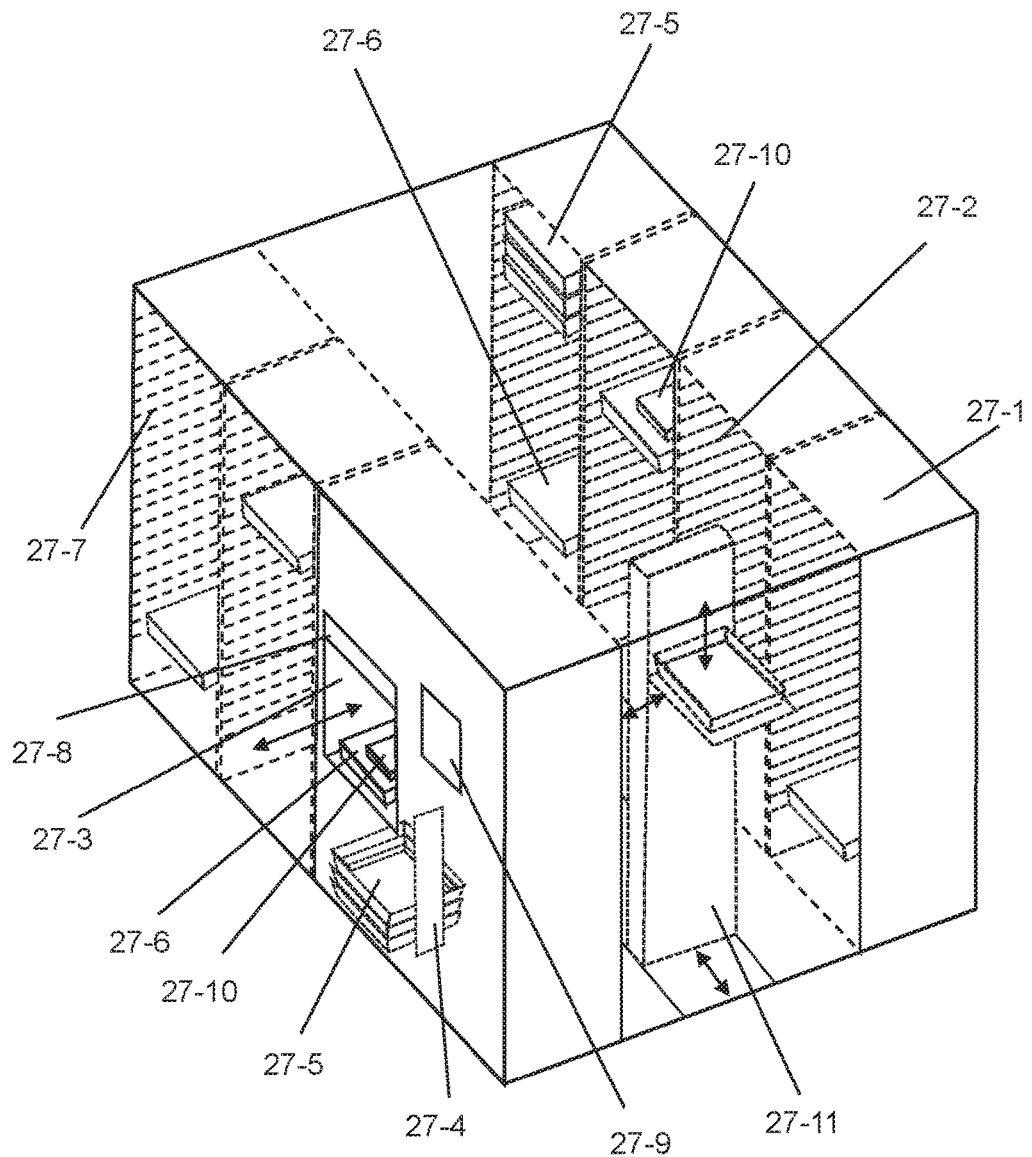
FIG. 10 describes an alternative embodiment of the parcel terminal according to the invention.
Figure 11:
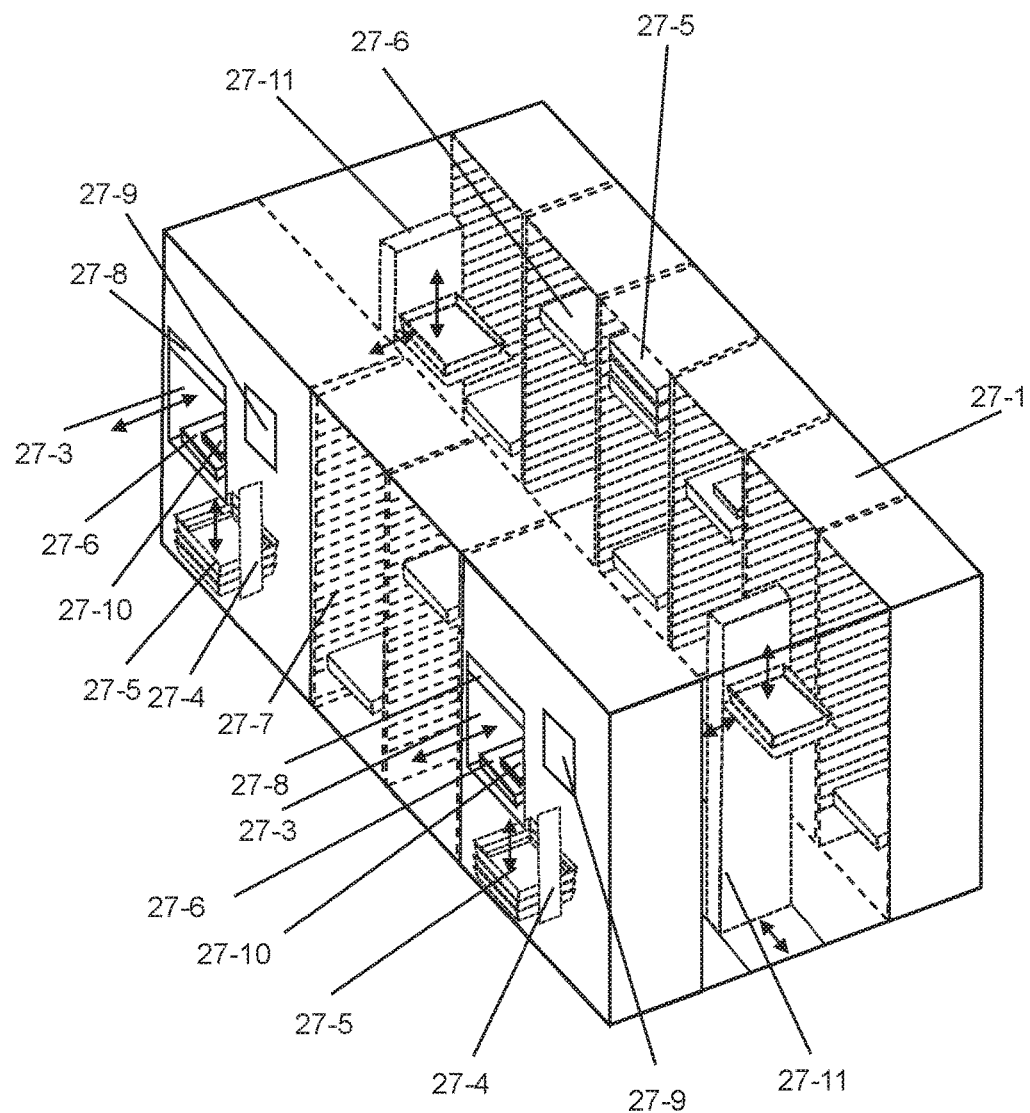
FIG. 11 describes another alternative embodiment of the parcel terminal according to the invention.

The parcel terminal for using in the method according to the invention depicted in FIGS. 9 to 11 comprises at least one storage space 27-1 with multiple compartments 27-2 within the parcel terminal for loading and storing the stacks of trays and postal objects on movable trays 27-10; an insertion and discharge area 27-3 with one or more insertion and discharge slots equipped with at least one door 27-8, whereas the insertion and discharge area includes a control unit 27-9; a loading mechanism 27-11 movable horizontally and vertically between the storage spaces and the storage spaces and the stacker 27-4 for transporting postal objects 27-10 from the insertion and discharge area 27-3 to the storage space 27-1 and loading in the storage area a postal object into the compartment 27-2 of the storage space 27-1 and for taking loaded and empty trays 27-6 from the storage area 27-1 to the stacker 27-4 and from the stacker 27-4 to the storage space 27-1, for transporting postal objects 27-10 from the storage space 27-1 to the insertion and discharge area 27-3; a stack of movable trays 27-5; a stacker 27-4, near the insertion and discharge area 27-3, of movable trays for storing the stack 27-5 of empty trays 27-6 and for lifting empty trays from the stacker 27-4 to the insertion and discharge area 27-3 and for lifting the stack of empty trays 27-5 from the insertion and discharge area 27-1.

In an alternative embodiment of the invention, the stacker 27-4 is used for refilling the stacks of trays or forming stacks of trays when there are no stacks in the storage area or the stack are already in use.

In an alternative embodiment of the invention, the compartments are formed so that their dimensions and size can be altered electronically or manually.

The control unit 27-9 is connected with the insertion and discharge area 27-3 of postal objects 27-10 and it comprises a user interface on the screen added to the outer side of the insertion and discharge area, and also comprises means for identifying the presence of the user (e.g., camera, etc.), identifying the user and postal objects, weighing and measuring postal objects, paying, and displaying instructions to the user, etc.

The insertion and discharge area 27-3 with at least one insertion and discharge slot equipped with at least one door 27-8, the control unit 27-9, the stacker 27-4 with at least one stack of trays 27-5 form a user zone of the parcel terminal.

The storage space 27-1 with multiple (or at least one) compartments 27-2, at least one loading mechanism 27-11 movable vertically and horizontally between the storage spaces 27-1 and between the storage spaces 27-1 and the stacker 27-4, the operation area of the loading mechanism 27-11 between the storage spaces 27-1 and between a storage space, the stacker and the rear side of the insertion and discharge area of postal objects form the internal zone of the parcel terminal.

The user zone and the internal zone of the parcel terminal are separated from each other by the operation area of the loading mechanism 27-11 in which the loading mechanism moves from the storage space 27-1 to the rear part of the insertion and discharge area 27-3 facing the inside of the parcel terminal.

The loading mechanism 27-11 may, for example, comprise of a tower/elevator to which a loader has been fixed so that the loader can be moved forth and back in the parcel terminal between the storage space 27-1 and the insertion and discharge area 27-3 of the parcel terminal, horizontally from one side of the storage space to the other and vertically up and down.

According to an alternative embodiment of the invention, the stacker 27-4 of the trays, which is located near the insertion and discharge area 27-3, is arranged below the insertion and discharge area 27-3 so that upon insertion of postal objects 27-10, empty trays 27-6 are continuously fed from the stacker 27-4 through the lower part of the insertion and discharge area that can be opened. In this case, the time spent on inserting several postal objects in sequence is decreased because after the insertion of the postal object onto the tray in the insertion and discharge area and loading of the postal object onto the loading mechanism for transporting it to the storage space, a new empty tray is immediately moved from the stacker located below the insertion and discharge area to the insertion and loading area for the next inserted postal object.

In another alternative embodiment of the invention, the parcel terminal has more than one insertion and discharge area and each of the insertion and discharge areas is connected to at least one stacker and separate loading mechanisms are provided for servicing each insertion and discharge area. This way, several parallel methods according to the invention can be performed in the parcel terminal to serve several users at a time who insert and/or retrieve postal objects, which again decreases the time spent on inserting and/or discharging the postal objects.

The invention claimed is:

1. A method for operating a parcel terminal, comprising:
    inserting and discharging postal objects in at least one insertion and discharge area of the parcel terminal per corresponding requests from a plurality of users using a plurality of trays and at least one stacker for placing a stack of trays out of a plurality of trays and for moving an appropriate tray between the at least one insertion and discharge area and the stack of trays, the at least one stacker and the stack of trays are located near the at least one insertion and discharge area, where each of the postal objects is inserted to or discharged from the appropriate tray;
    delivering a first postal object of the postal objects, inserted to a first tray, from the at least one insertion and discharge area to a storage area comprising one or more storage spaces each comprising multiple storing compartments within the parcel terminal, said delivering is provided parallel in time with inserting a second object to a second tray in the at least one insertion and discharge area to be delivered to the storage area, in order to reduce a total time for inserting and delivering of the first and second postal objects; and
    further delivering a fourth postal object of the postal objects on a fourth tray to the at least one insertion and discharge area from the storage area, said further delivering is provided parallel in time with discharging a third postal object from a third tray already further delivered to the at least one insertion and discharge area from the storage area and with placing the third tray to the at least one stacker substantially emptied from trays, in order to reduce a further total time for discharging and further delivering of the third and fourth postal objects, where the fourth tray, after discharging the fourth postal object, is also placed to the at least one stacker substantially emptied from trays.

2. The method for operating the parcel terminal of claim 1, wherein the inserting of a postal object comprises:
    identifying a presence of a user at the parcel terminal;
    identifying the user;
    identifying an intention of the user to insert one or more postal objects;
    checking, after identification of the user's intention to insert one or more postal objects, a number of trays for postal objects in the stack of trays and determining whether the number of trays is sufficient or critical for inserting the one or more postal objects; when the number of trays is sufficient, the insertion continues, but when the number of trays is critical, the stack of trays is replenished with additional trays, from the storage area in the parcel terminal using a loading mechanism, so that the stack of trays has the sufficient number of trays;

opening a door of an insertion and discharge slot in the insertion and discharge area of the parcel terminal for the user to insert one postal object of the one or more postal objects onto a tray of the stack of trays provided to the insertion and discharge area by the at least one stacker;

checking the inserted postal object with the sensors of a control unit whether the postal object is inserted correctly;

closing the door to the insertion and discharge area if the postal object is inserted correctly; and starting a cycle parallel in time with the insertion of another postal object in the insertion and discharge area for delivering the inserted one postal object on the tray to the at least one storage space for storing using the loading mechanism.

3. The method for operating the parcel terminal of claim 1, wherein the discharging of a postal object comprises:

identifying a presence of a user at the parcel terminal;

identifying the user;

identifying an intention of the user to retrieve one or more postal objects;

checking whether a number of trays in the stack of trays is sufficient or critical; when the number of trays is critical, the stack of trays is substantially emptied to the storage area in the parcel terminal using a loading mechanism;

after identifying the intention of the user to retrieve the one or more postal objects, directing the loading mechanism to a location of one postal object of the one or more postal objects in the at least one storage space and drawing the one postal object on a corresponding tray onto the loading mechanism;

further delivering the one postal object of the one or more postal objects on the corresponding tray by the loading mechanism to the insertion and discharge area;

discharging the one postal object after opening a door of an insertion and discharge slot in the insertion and discharge area;

closing the door after the one postal object is discharged;

placing the corresponding empty tray in the insertion and discharge area to the stack of trays substantially emptied from trays; and starting a cycle, parallel in time with said discharging and placing in the insertion and discharge area, for further delivering another postal object on another tray from the at least one storage space to the insertion and discharge area.

4. The method for operating the parcel terminal of claim 1, further comprising monitoring by at least one controller of the parcel terminal statistical data including a ratio of a number of insertions and a further number of discharges of the postal objects during a predefined period of time in the at least one insertion and discharge area; and adjusting a number of trays in the stack of trays near the at least one insertion and discharge area, depending on a monitored higher probability during the predefined period of time for the number of insertions or the further number of discharges based on said statistical data, in anticipation of corresponding insertions or corresponding discharges of consecutive postal objects to still further reduce a total cycle time for consecutively inserted or consecutively discharged postal objects.

5. The method according to claim 4, wherein adjusting the number of trays in the at least one stack for trays near the at least one insertion and discharge area comprises:

guiding a loading mechanism to the stack of trays with a critical number of trays located near the at least one insertion and discharge area;

drawing the stack of trays with the critical number of trays onto the loading mechanism;

guiding the loading mechanism to the storage area in the parcel terminal;

loading the stack of trays with the critical number of trays into the storage area;

loading a further stack having a sufficient number of trays or substantially emptied from trays on the loading mechanism from the storage area; and transporting the further stack using the loading mechanism back to a location near the at least one insertion and discharge area.

6. A method for operating a parcel terminal, comprising:

receiving at least one request from a user to import or export a postal object to at least one insertion and discharge area of the parcel terminal; and importing or exporting the postal object to the at least one insertion and discharge area based on the at least one request, wherein importing the postal object comprises delivering the postal object in a tray, from the at least one insertion and discharge area to a storage area comprising one or more storage spaces each comprising multiple storing compartments within the parcel terminal, while inserting a second postal object into a second tray at the at least one insertion and discharge area in order to reduce a total time for importing postal objects, and wherein exporting the postal object comprises delivering the postal object in the tray from the storage area to the at least one insertion and discharge area while discharging a third postal object from a third tray at the at least one insertion and discharge area in order to reduce a total time for exporting postal objects.

* * * * *